United States Patent
Ohmori et al.

(10) Patent No.: US 8,956,780 B2
(45) Date of Patent: Feb. 17, 2015

(54) SOLID OXIDE FUEL CELL

(75) Inventors: Makoto Ohmori, Nagoya (JP); Natsumi Shimogawa, Nagoya (JP); Toshiyuki Nakamura, Nagoya (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 751 days.

(21) Appl. No.: 12/350,323

(22) Filed: Jan. 8, 2009

(65) Prior Publication Data
US 2009/0191440 A1 Jul. 30, 2009

(30) Foreign Application Priority Data

Jan. 30, 2008 (JP) ................................. 2008-018470
Nov. 14, 2008 (JP) ................................. 2008-291857

(51) Int. Cl.
*H01M 8/10* (2006.01)
*H01M 8/24* (2006.01)
*H01M 8/12* (2006.01)
*H01M 8/02* (2006.01)

(52) U.S. Cl.
CPC .......... *H01M 8/2435* (2013.01); *H01M 8/1253* (2013.01); *H01M 8/0258* (2013.01); *Y02E 60/521* (2013.01); *Y02E 60/525* (2013.01)
USPC ......................................... 429/479; 429/483

(58) Field of Classification Search
CPC ............... Y02E 60/525; H01M 8/1004; H01M 2008/1293
USPC ........................................................ 429/479
See application file for complete search history.

(56) References Cited

U.S. PATENT DOCUMENTS

| 7,303,833 B2 * | 12/2007 | Cortright et al. ............. 429/495 |
| 7,323,268 B2 | 1/2008 | Robert |
| 2005/0048343 A1 | 3/2005 | Thirukkvalur |
| 2005/0221153 A1 * | 10/2005 | Sugimoto et al. ............. 429/38 |
| 2007/0141445 A1 * | 6/2007 | Hertz et al. .................... 429/40 |
| 2007/0178227 A1 * | 8/2007 | Hunt et al. ..................... 427/79 |

FOREIGN PATENT DOCUMENTS

| JP | 11016585 | * | 1/1999 | ............. H01M 8/02 |
| JP | 2002-329508 A1 | | 11/2002 | |
| JP | 2004-342584 A1 | | 12/2004 | |
| JP | 2005-072011 A1 | | 3/2005 | |
| WO | 2006/004956 A2 | | 1/2006 | |

* cited by examiner

*Primary Examiner* — Ula C Ruddock
*Assistant Examiner* — Archer Dudley
(74) *Attorney, Agent, or Firm* — Burr & Brown, PLLC

(57) ABSTRACT

A solid oxide fuel cell has a stack structure in which sheet bodies and separators for separating air and fuel gas are stacked in alternating layers. Each of the sheet bodies includes an electrolyte layer, a fuel electrode layer formed on the upper surface of the electrolyte layer, and an air electrode layer formed on the lower surface of the electrolyte layer, wherein these layers are stacked and fired in such a manner that the electrolyte layer is sandwiched between the fuel electrode layer and the air electrode layer. The thickness of the electrolyte layer is 0.3 μm or more and 5 μm or less, and the electrolyte layer is composed of a single particle of YSZ in the thickness direction. Thus, the electrolyte layer is extremely thin, and further, the grain boundary in the thickness direction is small. Accordingly, the IR loss (electric resistance) of the electrolyte layer can remarkably be reduced.

8 Claims, 11 Drawing Sheets

SOLID OXIDE FUEL CELL

BACKGROUND OF THE INVENTION

1. Field of the Invention

The present invention relates to a solid oxide fuel cell (SOFC), and particularly to a solid oxide fuel cell having a (flat-plate) stack structure in which sheet bodies (may also be referred to as "single cells") and support members (may also be referred to as the "interconnectors") are stacked in alternating layers.

2. Background of the Invention

Conventionally, a solid oxide fuel cell having the above-mentioned stack structure has been known (refer to, for example, Japanese Patent Application Laid-Open (kokai) No. 2004-342584). In this case, the sheet body can be a fired body in which a solid electrolyte layer formed from zirconia, a fuel electrode layer, and an air electrode layer are arranged in layers such that the fuel electrode layer is formed on the upper surface of the solid electrolyte layer and such that the air electrode layer is formed on the lower surface of the solid electrolyte layer.

For each sheet body, a channel (fuel channel) of a fuel gas (hydrogen gas) is defined between the sheet body and the support member formed above the sheet body so as to be adjacent to the sheet body, while a channel (air channel) of a gas (air) containing oxygen is defined between the sheet body and the support member formed below the sheet body so as to be adjacent to the sheet body.

In the structure described above, a fuel gas is supplied to the fuel channel and air is supplied to the air channel with the temperature of the SOFC (specifically, sheet body) being raised and heated to a working temperature (e.g., 800° C.) of the SOFC. Thus, the fuel gas and air are brought into contact with the upper surface (fuel electrode layer) and the lower surface (air electrode layer) of each of the sheet bodies respectively, whereby electricity generating reaction (refer to the later-described Formulas (1) and (2)) is produced for each sheet body. As a result, the stack structure can serve as a cell. For convenience of description, the plane direction of the stacked sheet bodies (or support members) is merely referred to as "plane direction", and the direction in which the sheet bodies and the support members are stacked (the direction vertical to the plane direction) is referred to as "stacking direction".

SUMMARY OF THE INVENTION

In the sheet body having the three-layered structure described above, electric resistance generated when current (specifically, electrons $e^-$, oxygen ions $O^{2-}$) flows in the stacking direction and reaction resistance in the fuel electrode layer and the air electrode layer due to the electricity generating reaction are inevitably present. By virtue of the presence of the electric resistance and reaction resistance, the output voltage V of the sheet body is lowered from the theoretical electromotive force V0 according to the increase in the current I flowing through the sheet body as shown in FIG. 12. Here, the amount of reduced voltage caused by the electric resistance of the sheet body is referred to as "IR loss", and the amount of reduced voltage caused by the reaction resistance of the sheet body is referred to as "reaction loss".

The output of the sheet body can be expressed by the area of the region indicated by a hatched line in FIG. 12. For example, when the current I=I1, the output of the sheet body becomes "I1·V1". Accordingly, the output of the sheet body (accordingly, the output of the SOFC) can be increased by reducing the IR loss and the reaction loss.

The IR loss of the sheet body is composed of the IR loss of the electrolyte layer, the IR loss of the fuel electrode layer, the IR loss of the air electrode layer, and the IR loss at the interface portions between the layers. The present inventors have paid attention on the IR loss of the electrolyte layer, which is the greatest, and have found out the structure capable of remarkably reducing the IR loss of the electrolyte layer.

From the above, the present invention aims to provide an SOFC having a stack structure in which the IR loss (electric resistance) of the electrolyte layer is remarkably reduced so as to increase the output of the SOFC.

Like the SOFC described above, the SOFC according to the present invention includes a single or a plurality of sheet bodies that has a solid electrolyte layer, a fuel electrode layer formed on the upper surface of the solid electrolyte layer, and an air electrode layer formed on the lower surface of the solid electrolyte layer, these layers being stacked and fired, and a plurality of support members for supporting the single or the plurality of sheet bodies, wherein the sheet bodies and the support members are stacked in alternating layers.

For each sheet body, a channel (fuel channel) of a fuel gas is defined between the sheet body and the support member formed above the sheet body so as to be adjacent to the sheet body, while a channel (air channel) of a gas containing oxygen is defined between the sheet body and the support member formed below the sheet body so as to be adjacent to the sheet body.

The SOFC according to the present invention is characterized in that the thickness of the solid electrolyte layer is 0.3 μm or more and 5 μm or less, and the solid electrolyte layer is made of a single particle in the thickness direction of the solid electrolyte layer. The thickness of the sheet body is preferably 20 μm or more and 200 μm or less.

The IR loss of the solid electrolyte layer is caused by electric resistance generated when oxygen ions $O^{2-}$ pass in the thickness direction (stacking direction). As the thickness of the solid electrolyte layer is decreased, the IR loss (electric resistance) of the solid electrolyte layer can be reduced. From this viewpoint, the present inventors have examined whether the solid electrolyte layer can be made very thin. As a result, the inventors have succeeded in forming a solid electrolyte layer having a thickness of 0.3 μm or more and 5 μm or less and made of a single particle in the thickness direction.

Since the solid electrolyte layer is made of a single particle in the thickness direction, the grain boundary (boundary between particles), which is a cause for increasing the electric resistance in the thickness direction, is reduced. Therefore, according to the above-mentioned configuration, the solid electrolyte layer is extremely thin, and the grain boundary in the thickness direction is small, whereby the IR loss of the solid electrolyte layer can remarkably be reduced, compared to a solid electrolyte layer having a thickness of about 10 μm and composed of two or more particles in the thickness direction.

When the IR loss of the solid electrolyte layer is extremely small, the oxygen ion conductivity in the solid electrolyte layer becomes sufficiently great. Thus, the "catalyst reaction for ionizing oxygen" in the air electrode layer is promoted. Accordingly, the reaction loss at the air electrode layer is reduced, compared to the case in which the solid electrolyte layer is thick. It can be considered that, by virtue of this configuration, the output of the SOFC can effectively be increased because of the operation described above.

Since the thickness of the solid electrolyte layer having the greatest Young's modulus among the three layers constituting the sheet body is extremely small, the whole sheet body is likely to be deformed. Accordingly, even when the difference in the amount of expansion and contraction is locally generated in the sheet body due to the temperature difference in the sheet body in case where the temperature of the SOFC is rapidly raised, the sheet body is easy to be deformed according to the difference in the amount of expansion and contraction. Consequently, the internal stress (thermal stress) caused by the difference in expansion and contraction can be canceled, whereby the durability of the sheet body with respect to the thermal stress can be increased. Since the solid electrolyte layer having the greatest Young's modulus is formed to be extremely thin, the warp of the sheet body after the firing of the sheet body or after the reduction of the fuel electrode layer can be reduced.

When the electrolyte layer having a thickness of 0.3 μm or more and 5 μm or less, made of a single particle in the thickness direction, and having a reduced IR loss is formed as described above, it has been found that, in the field of view including particles, which form the solid electrolyte layer, of a predetermined number of two or more as viewed from the side, the average value of the ratios of the height of the particles in the thickness direction of the solid electrolyte layer to the widths of the particles in the plane direction of the solid electrolyte layer with respect to the particles of the above-mentioned predetermined number is not more than 3. Specifically, each particle constituting the solid electrolyte layer forms a flattened shape extending in the plane direction of the solid electrolyte layer.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE INVENTION

Figure 1:
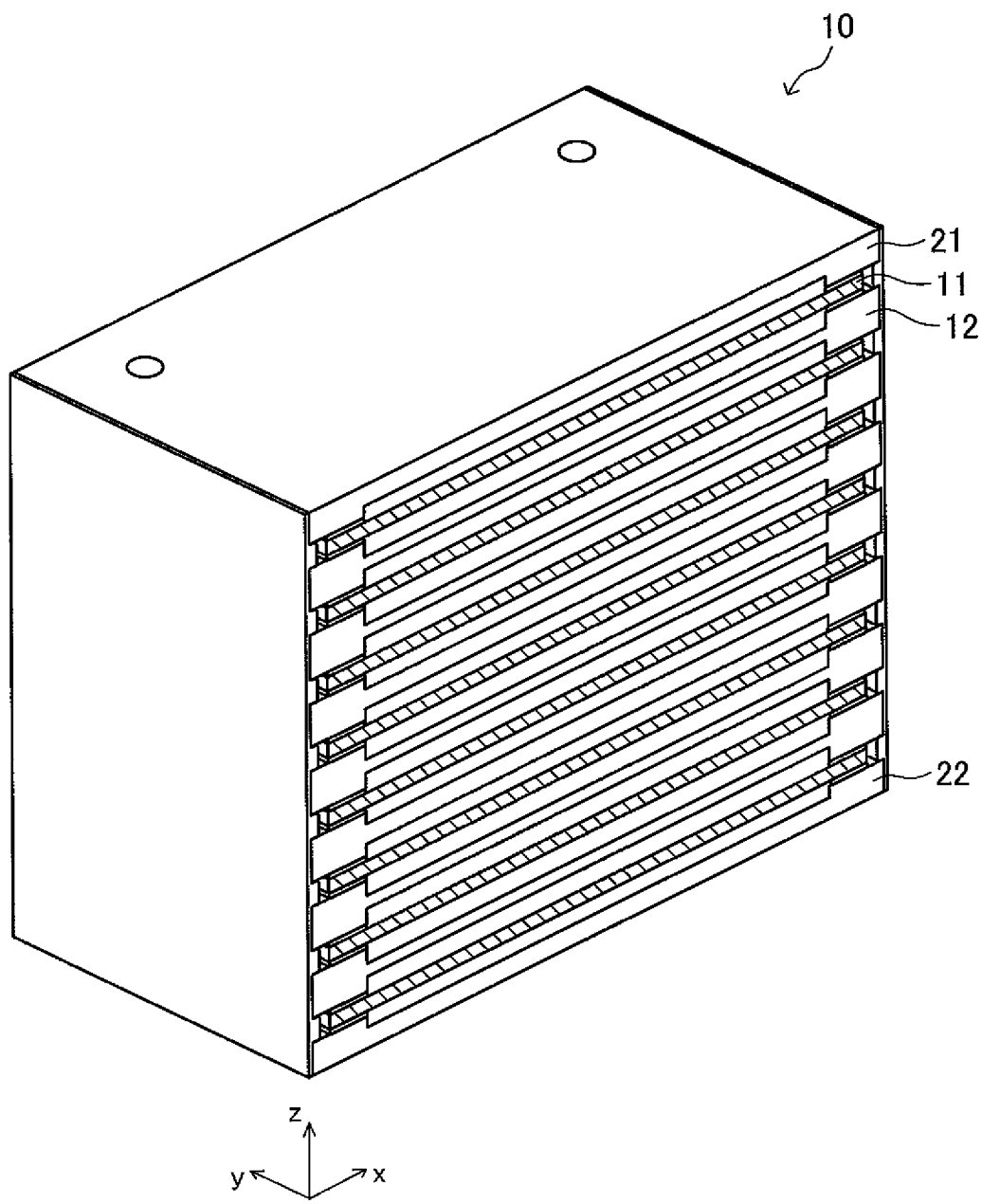
FIG. 1 is a cutaway perspective view of a solid oxide fuel cell according to an embodiment of the present invention.
Figure 2:
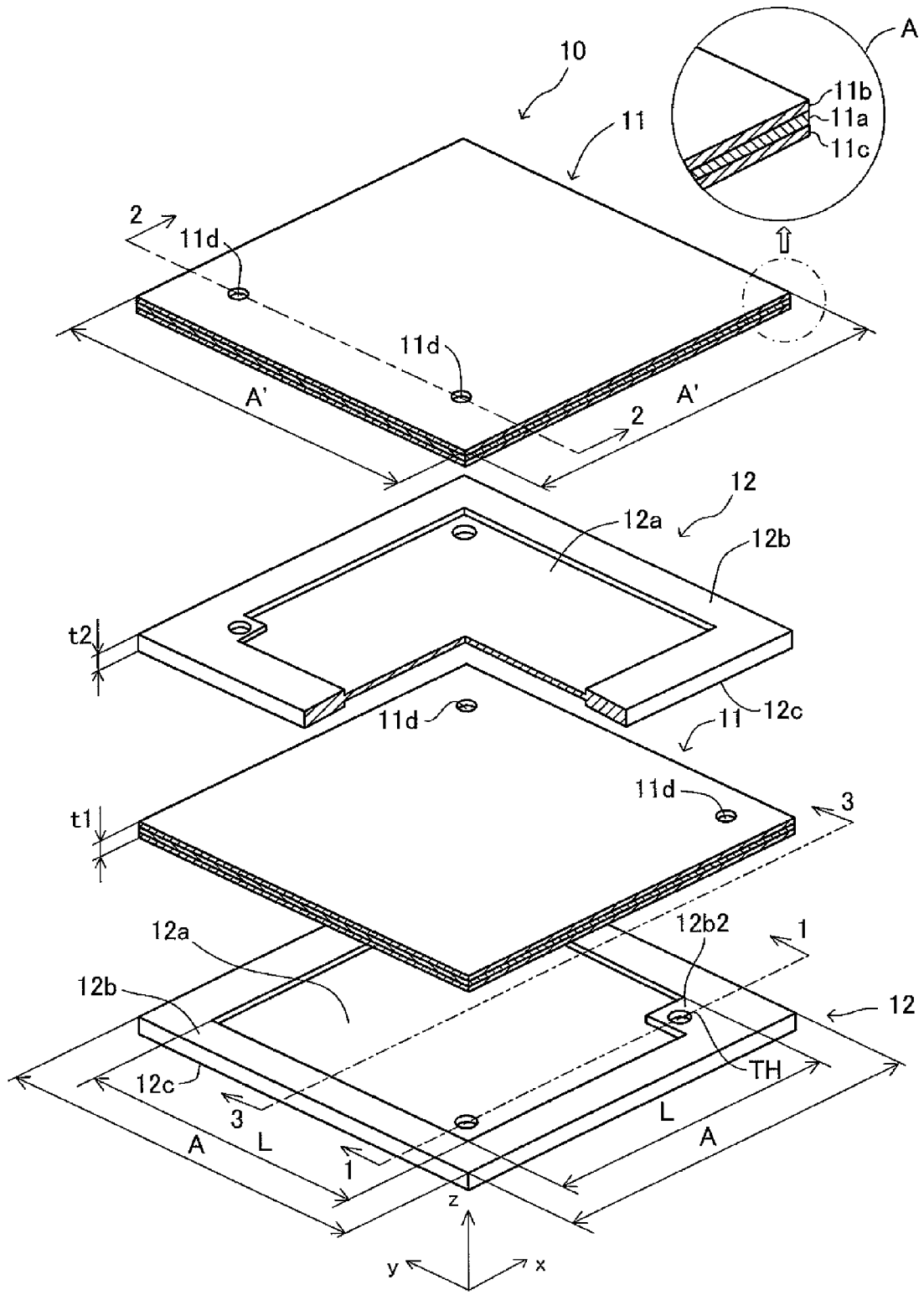
FIG. 2 is an exploded partial perspective view of the fuel cell shown in FIG. 1.

A solid oxide fuel cell according to an embodiment of the present invention will next be described with reference to the drawings.
Overall Structure of Fuel Cell:

FIG. 1 perspectively shows, in a cutaway fashion, a solid oxide fuel cell (hereinafter, referred to merely as the "fuel cell") 10, which is a device according to an embodiment of the present invention. FIG. 2 perspectivey and partially shows, in an exploded fashion, the fuel cell 10. The fuel cell 10 is configured such that sheet bodies 11 and separators (support members) 12 are stacked in alternating layers. That is, the fuel cell 10 has a flat-plate stack structure.

In the flat-plate stack structure described above, an upper cover member 21 is arranged and fixed above the sheet body 11 positioned at the uppermost part, while a lower cover member 22 is arranged and fixed below the sheet body 11 positioned at the lowermost part. The sheet body 11 is also referred to as a "single cell" of the fuel cell 10.

As shown on an enlarged scale within a circle A of FIG. 2, the sheet body 11 is a fired body having an electrolyte layer (solid electrolyte layer) 11a, a fuel electrode layer 11b formed on the electrolyte layer 11a (on the upper surface of the electrolyte layer 11a), and an air electrode layer 11c formed on a side of the electrolyte layer 11a opposite the fuel electrode layer 11b (on the lower surface of the electrolyte layer 11a). The planar shape of the sheet body 11 is a square having sides (length of one side=A') extending along mutually orthogonal x- and y-axes. The sheet body 11 is a plate member (thickness=t1) having a thickness along a z-axis orthogonal to the x-axis and the y-axis.

In the present embodiment, the electrolyte layer 11a is a dense fired body of YSZ (yttria-stabilized zirconia). The fuel electrode layer 11b is a fired body of NiO-YSZ and a porous electrode layer. The fuel electrode layer 11b becomes Ni-YSZ cermet after the reduction process so as to function as a fuel electrode. The air electrode layer 11c is a fired body of LSCF (La0.6Sr0.4Co0.2Fe0.8O3: lanthanum strontium cobalt ferrite) and a porous electrode layer. The electrolyte layer 11a, the fuel electrode layer 11b, and the air electrode layer 11c have different room-temperature-to-1000° C. mean thermal expansion coefficients of about 10.8 ppm/K, 12.5 ppm/K, and 11.5 ppm/K, respectively.

The sheet body 11 has a pair of cell through-holes 11d. Each of the cell through-holes 11d extends through the electrolyte layer 11a, the fuel electrode layer 11b, and the air electrode layer 11c. The paired cell through-holes 11d are formed in the vicinity of one side of the sheet body 11 and in the vicinity of corresponding opposite ends of the side. The shape or the like of the sheet body 11 will be described in detail later.

Figure 3:
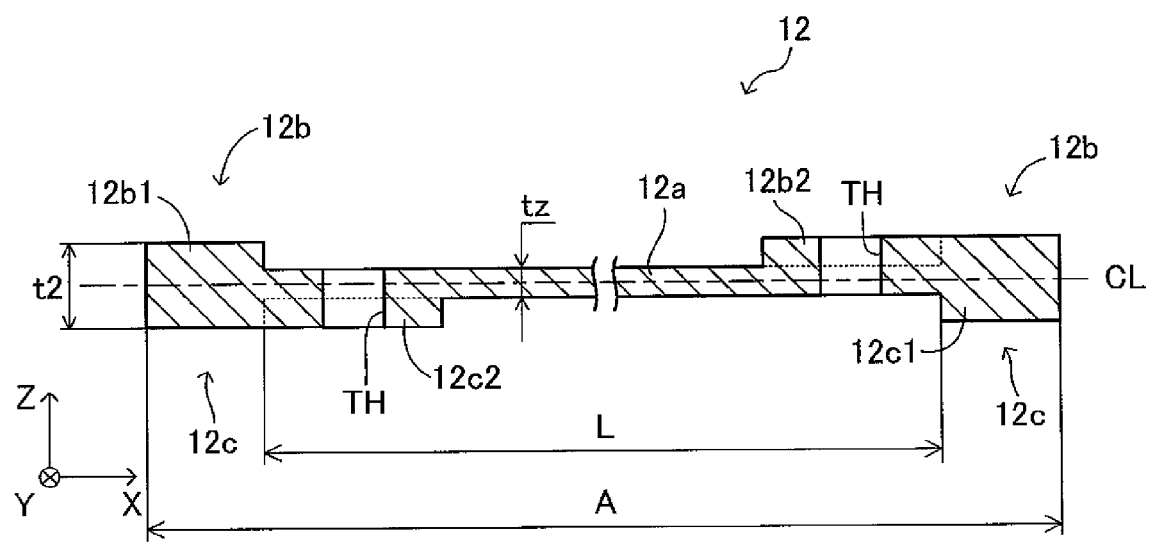
FIG. 3 is a sectional view of a separator taken along a plane that includes line 1-1 of FIG. 2 and is in parallel with an x-z plane.

FIG. 3 is a sectional view of the separator 12 taken along a plane that includes line 1-1 of FIG. 2 parallel with the x-axis and is in parallel with the x-z plane. As shown in FIGS. 2 and 3, the separator 12 includes a plane portion 12a, an upper frame portion 12b, and a lower frame portion 12c. The upper frame portion 12b and the lower frame portion 12c constitute the "frame portion of the separator". The planar shape of the separator 12 is a square having sides (length of one side=A, A is slightly larger than A') extending along the mutually orthogonal x- and y-axes. The thickness of the plane portion 12a is tz, and the thickness of the "frame portion" is t2 (>tz).

The length of one side A of the separator 12 is 5 mm or more and 200 mm or less in the present embodiment. The length L of one side of the planar shape (=square) of the plane portion 12a of the separator 12 is 4 mm or more and 190 mm or less in the present embodiment. The thickness t2 of the "frame portion" of the separator 12 is 200 μm or more and 1000 μm or less. The thickness tz of the plane portion 12a of the separator 12 is 50 μm or more and 100 μm or less.

The separator 12 is formed from an Ni-based heat-resistant alloy (e.g., ferritic SUS, INCONEL 600, or HASTELLOY). The separator 12 formed from, for example, SUS 430, which is a ferritic SUS, has a room-temperature-to-1000° C. mean thermal expansion coefficient of about 12.5 ppm/K. Thus, the thermal expansion coefficient of the separator 12 is higher than the mean thermal expansion coefficient of the sheet body 11. Therefore, when the temperature of the fuel cell 10 changes, the difference in the amount of expansion and contraction is produced between the sheet body 11 and the separator 12.

The plane portion 12a is a thin, flat body having a thickness along the z-axis. The planar shape of the plane portion 12a is a square having sides (length of one side=L (<A)) extending along the x-axis and the y-axis.

The upper frame portion 12b is a frame body provided around the plane portion 12a (in a region in the vicinity of the four sides of the plane portion 12a; i.e., an outer peripheral region of the plane portion 12a) in an upwardly projecting condition. The upper frame portion 12b consists of a perimetric frame portion 12b1 and a jutting portion 12b2.

The perimetric frame portion 12b1 is located on a side toward the perimeter of the separator 12. The vertical section of the perimetric frame portion 12b1 (e.g., a section of the perimetric frame portion 12b1 whose longitudinal direction coincides with the direction of the y-axis, taken along a plane parallel with the x-z plane) assumes a rectangular shape (or a square shape).

The jutting portion 12b2 juts toward the center of the separator 12 from the inner peripheral surface of the perimetric frame portion 12b1 at one of four corner portions of the plane portion 12a. The lower surface of the jutting portion 12b2 is integral with the plane portion 12a. The shape of the jutting portion 12b2 as viewed in plane is generally square. The upper surface (plane surface) of the jutting portion 12b2 is continuous with the upper surface (plane surface) of the perimetric portion 12b1. The jutting portion 12b2 has a through-hole TH formed therein. The through-hole TH also extends through a portion of the plane portion 12a that is located under the jutting portion 12b2.

The lower frame portion 12c is a frame body provided around the plane portion 12a (in a region in the vicinity of the four sides of the plane portion 12a; i.e., an outer peripheral region of the plane portion 12a) in a downwardly projecting condition. The lower frame portion 12c is symmetrical with the upper frame portion 12b with respect to a centerline CL that halves the thickness of the plane portion 12a. Accordingly, the lower frame portion 12c has a perimetric frame portion 12c1 and a jutting portion 12c2 that are identical in shape with the perimetric frame portion 12b1 and the jutting portion 12b2, respectively. However, the jutting portion 12c2 is formed at the plane portion 12a in such a manner as to be diagonally opposite the jutting portion 12b2 as viewed in plane.

Figure 4:
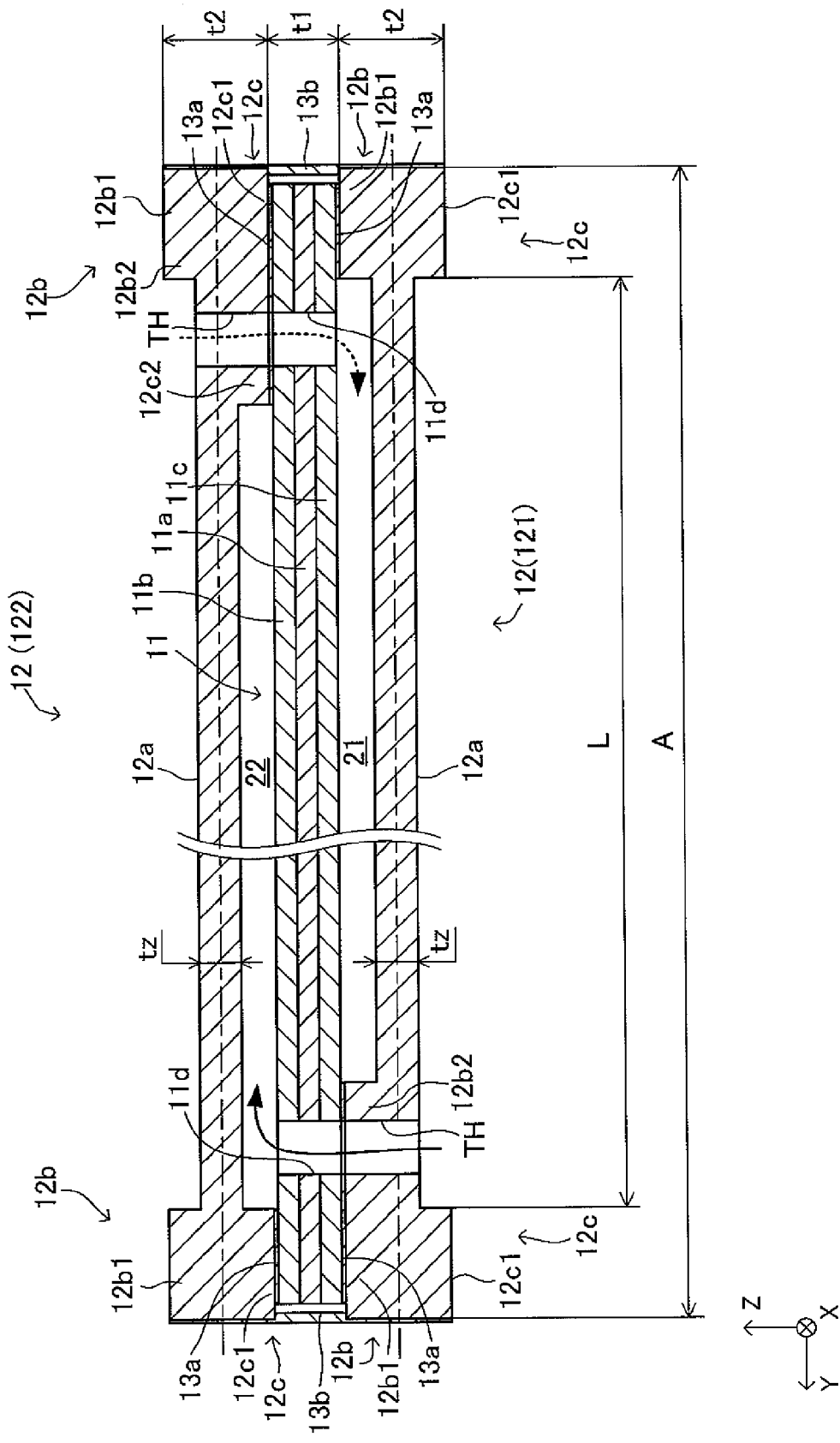
FIG. 4 is a vertical sectional view of the sheet body and the separator, which holds the sheet body, shown in FIG. 1, taken along a plane that includes line 2-2 of FIG. 2 and is in parallel with a y-z plane.

FIG. 4 is a vertical sectional view of the sheet body 11 and a pair of the separators 12 in a state of supporting (holding) the sheet body 11 therebetween, the sectional view being taken along a plane that includes line 2-2 of FIG. 2 parallel with the y-axis and is in parallel with the y-z plane. As described previously, the fuel cell 10 is formed by stacking the sheet bodies 11 and the separators 12 in alternating layers.

For convenience of description, of the paired support members 12, the support member 12 adjacent to the lower side of the sheet body 11 is referred to as a lower support member 121, and the support member 12 adjacent to the upper side of the sheet body 11 is referred to as an upper support member 122. As shown in FIG. 4, the lower support member 121 and the upper support member 122 are coaxially arranged such that the lower frame portion 12c of the upper support member 122 is located above the upper frame portion 12b of the lower support member 121 in a mutually facing manner.

The entire perimetric portion of the sheet body 11 is sandwiched between the upper frame portion 12b (perimetric portion) of the lower support member 121 and the lower frame portion 12c (perimetric portion) of the upper support member 122. At this time, the sheet body 11 is arranged such that the air electrode layer 11c faces the upper surface of the plane portion 12a of the lower support member 121 and such that the fuel electrode layer 11b faces the lower surface of the plane portion 12a of the upper support member 122.

The entire perimetric portion of the sheet body 11, the upper frame portion 12b of the lower separator 121, and the lower frame portion 12c of the upper separator 122 are bonded (sealed) to one another by means of a seal member 13.

The seal member 13 has a first seal portion 13a that bonds (seals) the space (boundary portion) between the upper surface of the perimetric portion of the sheet body 11 and the lower surface of the lower frame portion 12c of the upper separator 122, and the space (boundary portion, first bonded portion) between the lower surface of the perimetric portion of the sheet body 11 and the upper surface of the upper frame portion 12b of the lower separator 121. The seal member 13 also has a second seal portion 13b that bonds (seals) the space (gap, second bonding portion) between the lower side end (lower end of the side face) of the lower frame portion 12c of the upper separator 122 and the upper side end (upper end of the side face) of the upper frame portion 122b of the lower separator 121. The second seal portion 13b is separated from the first seal portion 13a. The second seal portion 13b is continuous over the side face of the fuel cell 10 having the stack structure.

The first seal portion 13a is made of an amorphous glass having a first softening temperature, which is lower than the working temperature (e.g., 600 to 800° C.) of the fuel cell 10. The first seal portion 13a exhibits a function of sealing the first bonding portion. Additionally, when the temperature of the fuel cell 10 (specifically, the temperature of the first seal portion 13a) is less than the first softening temperature, the first seal portion 13a makes the relative movement of the first bonding portion impossible. On the other hand, when the temperature of the fuel cell 10 (specifically, the temperature of the first seal portion 13a) is not less than the first softening temperature, the first seal portion 13a allows the relative movement of the first bonding portion, since the first seal portion 13a is softened. Thus, the internal stress (thermal stress) caused by the difference in the amount of the expansion and contraction between the sheet body 11 and the separator 12 described above can be canceled.

On the other hand, the second seal portion 13b is made of ceramics (specifically, made of a material containing crystalline substance, such as a crystalline glass, glass ceramics, etc., in which amorphous substance and crystalline substance may be mixedly present). The second seal portion 13b exhibits the function of sealing the second bonding portion. Additionally, the second seal portion 13b makes the relative movement of the second bonding portion impossible at all times. Thus, the whole shape of the fuel cell 10 (the shape having the stack structure) can be maintained.

The material having the same composition can be used for the first seal portion 13a having the buffer function of the thermal stress and the second seal portion 13b having the gas seal function. When the material having the different composition is used, decomposition may be produced at the bonding portion due to the thermal history during the operation of the SOFC. When the material having the same composition is used, the decomposition described above can be prevented.

Specifically, the material having the same composition is used for both seal portions 13a and 13b, but the particle size is differed so as to allow the progression degree of the crystallization to be different from each other. Thus, the functions of the first seal portion 13a and the second seal portion 13b are made different. For example, a glass material having a great particle diameter (e.g., about 1 μm) is used for the first seal portion 13a, while a glass material having a small particle diameter (e.g., about not more than 0.3 μm) is used for the second seal portion 13b. This structure can produce a difference in the progression degree of the crystallization at the temperature (e.g., 850° C.) upon the heat treatment for the glass bonding during the assembly of the stack. Specifically, in the first seal portion 13a having the great particle diameter, a semicrystalline state is kept in which an amorphous layer is partly left since the crystallization is not completely advanced. On the other hand, the crystallization can be completed in the second seal portion 13b having the small particle diameter. Thus, the buffer function for the thermal stress can be provided to the first seal portion 13a that is in the semicrystalline state, while the gas seal function can be provided to the second seal portion 13b in which the crystallization is completed.

Thus, as shown in FIG. 4, the upper surface of the plane portion 12a of the lower support member 121, the inner wall surface of the upper frame portion 12b (the perimetric frame portion 12b1 and the jutting portion 12b2) of the lower support member 121, and the lower surface of the air electrode layer 11c of the sheet body 11 define an air channel 21 through which a gas containing oxygen (air) flows. The gas containing oxygen flows into the air channel 21 through the through-hole TH of the upper separator 122 and the cell through-hole 11d of the sheet body 11 as indicated by an arrow of a broken line in FIG. 4.

Similarly, the lower surface of the plane portion 12a of the upper support member 122, the inner wall surface of the lower frame portion 12c (the perimetric frame portion 12c1 and the jutting portion 12c2) of the upper support member 122, and the upper surface of the fuel electrode layer 11b of the sheet body 11 define a fuel channel 22 through which a fuel containing hydrogen flows. The fuel flows into the fuel channel 22 through the through-hole TH of the lower separator 121 and the cell through-hole 11d of the sheet body 11 as indicated by an arrow of a solid line in FIG. 4. Although not shown in FIG. 4, a current-collecting metal mesh may be confined in each of the air channel 21 and/or the fuel channel 22.

Figure 5:
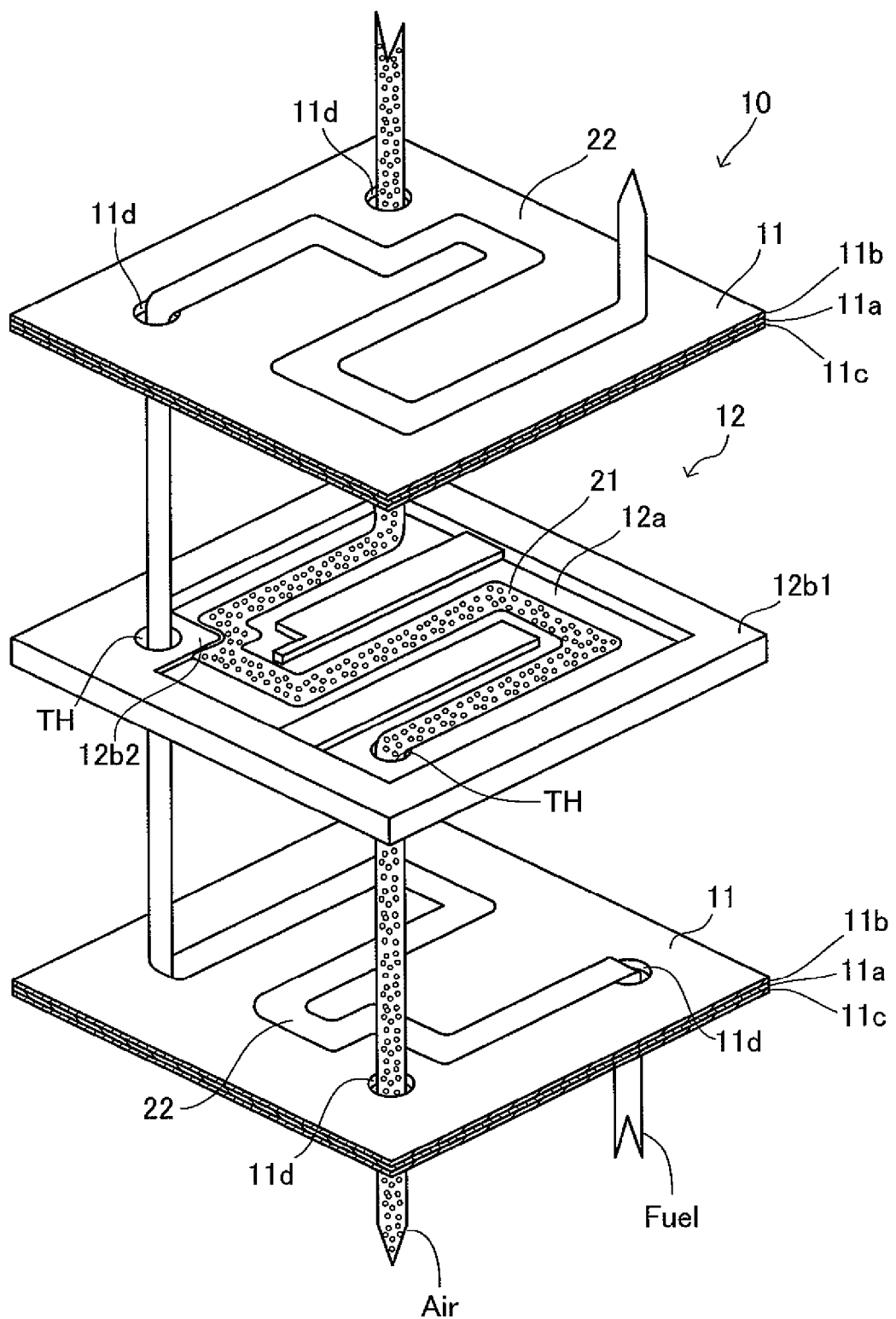
FIG. 5 is a view for explaining a circulation of fuel and air in the fuel cell shown in FIG. 1.

In the thus-configured fuel cell 10, as shown in FIG. 5, the fuel is supplied to the fuel channel 22 formed between the fuel electrode layer 11b of the sheet body 11 and the lower surface of the plane portion 12a of the separator 12, while air is supplied to the air channel 21 formed between the air electrode layer 11c of the sheet body 11 and the upper surface of the plane portion 12a of the separator 12, whereby electricity is generated while utilizing the chemical reactions expressed below by Formulas (1) and (2).

$$(1/2) \cdot O_2 + 2e^- \rightarrow O^{2-} \text{ (at air electrode layer 11}c\text{)} \quad (1)$$

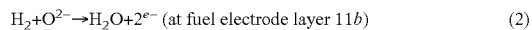

$$H_2 + O^{2-} \rightarrow H_2O + 2e^- \text{ (at fuel electrode layer 11}b\text{)} \quad (2)$$

Since the fuel cell (SOFC) 10 utilizes oxygen conductivity of the solid electrolyte layer 11a for generating electricity, the working temperature of the fuel cell 10 is generally 600° C. or higher. Accordingly, the temperature of the fuel cell 10 is raised from room temperature to the working temperature (e.g., 800° C.) by means of an external heating mechanism (e.g., a heating mechanism that uses a resistance heater or a heating mechanism that utilizes heat generated through combustion of a fuel gas).

Figure 6:
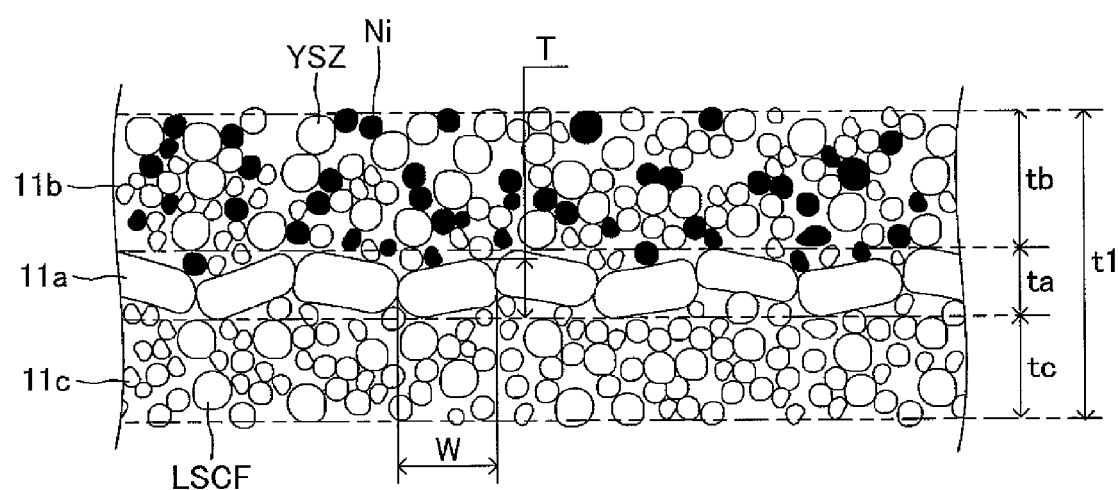
FIG. 6 is a partial side view of the sheet body shown in FIG. 2.

Detail of Sheet Body:

The detail of the sheet body 11 will next be described. As shown in FIG. 6 that is a partial side view of the sheet body 11, the fuel electrode layer 11b is a porous layer made of fine particles (e.g., particles each having a diameter of less than 1 μm) such as Ni and YSZ. The air electrode layer 11c is a porous layer made of fine particles (e.g., particles each having a diameter of less than 1 μm) such as LSCF.

Figure 7:
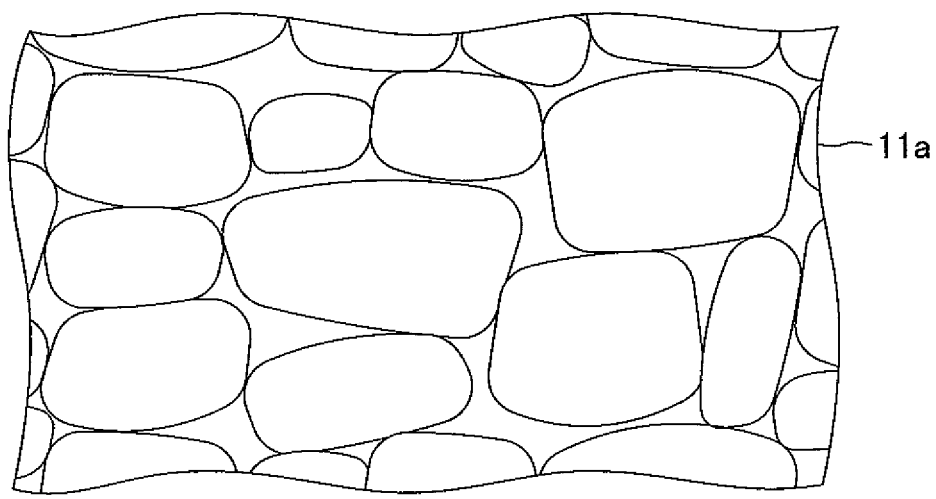
FIG. 7 is a partial plan view of the electrolyte layer shown in FIG. 2.

On the other hand, as shown in FIG. 6 and FIG. 7 that is a partial plan view of the electrolyte layer 11a, the electrolyte layer 11a is made of a single particle of YSZ in the thickness direction. The electrolyte layer 11a may be made of a single particle of only ScSZ (scandium-doped zirconia) in the thickness direction. In the field of view including particles of a predetermined number of two or more as viewed from the side (e.g., seven in the field of view in FIG. 6), the average value of the ratio (T/W) of the height T of the particle in the thickness direction of the electrolyte layer 11a to the width W of the particle in the plane direction of the electrolyte layer 11a with respect to the particles of the above-mentioned predetermined number is not more than 3. Specifically, each particle constituting the electrolyte layer 11a forms a flattened shape extending in the plane direction of the electrolyte layer 11a.

The thickness t1 of the sheet body 11 is uniform all over. In the present embodiment, the thickness t1 is 20 μm or more and 50 μm or less, preferably 20 μm or more and 200 μm or less. For example, the thickness ta of the electrolyte layer 11a is 0.3 μm or more and 5 μm or less, the thickness tb of the fuel electrode layer 11b is 5 μm or more and 500 μm or less, and the thickness tc of the air electrode layer 11c is 5 μm or more and 200 μm or less.

As described above, in the present embodiment, the fuel electrode layer 11b is the thickest in the sheet body 11, so that the fuel electrode layer 11b supports the whole sheet body 11. Since the fuel electrode layer 11b contains metal (Ni), the fuel electrode layer 11b is more flexible (toughness) than the electrolyte layer 11a and the air electrode layer 11c. Accordingly, the sheet body 11 can be a structure having excellent flexibility by making the fuel electrode layer 11b the thickest in the sheet body 11. Further, the thickness of the electrolyte layer 11a is very thin such as 0.3 μm or more and 5 μm or less, and the fuel electrode layer 11b is a thick layer that supports the whole sheet body 11, whereby the fuel cell (SOFC) 10 having excellent starting characteristic can be obtained.

Figure 8A:
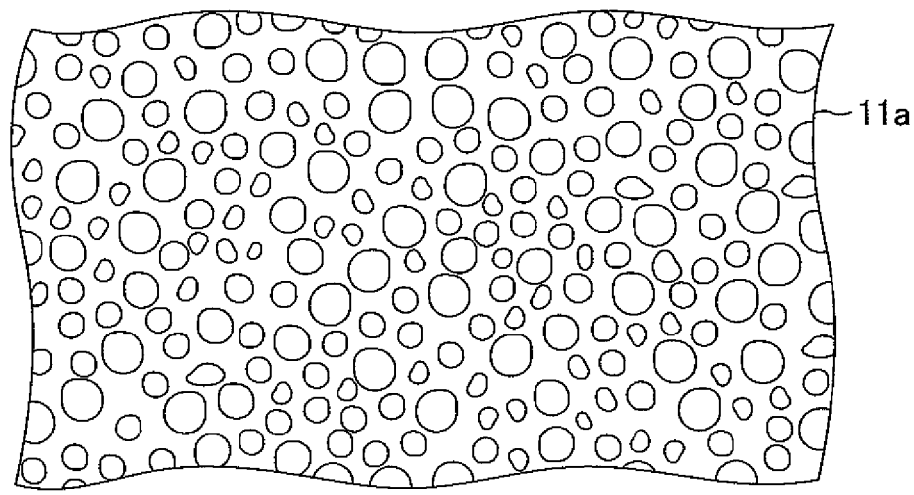
FIG. 8A is a plan view showing the state of a layer before it is fired during a process for manufacturing the electrolyte layer shown in FIG. 2.
Figure 8B:
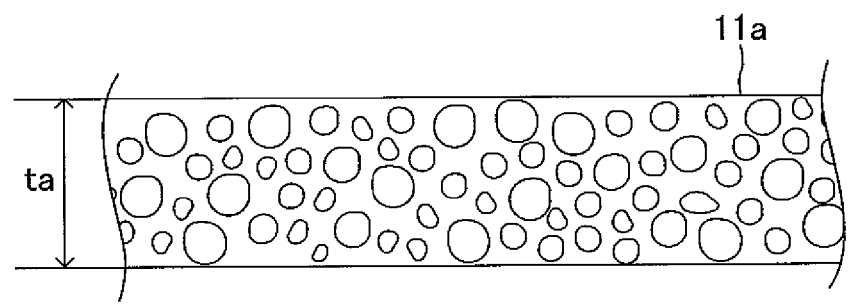
FIG. 8B is a side view showing the state of a layer before it is fired during a process for manufacturing the electrolyte layer shown in FIG. 2.

Example of Manufacturing Method:

Next, an example method for manufacturing the fuel cell 10 will be briefly described. First, the method for manufacturing the sheet body 11 will be described. First, a ceramic green sheet (that is to become the electrolyte layer 11a) made of powders each having a very small diameter (e.g., not more than 1 μm) of YSZ is laminated on the lower surface of a sheet (that is to become the fuel electrode layer 11b) as shown in FIGS. 8A and 8B. The sheet (that is to become the electrolyte layer 11a) made of the above-mentioned powders may be formed on the lower surface of the sheet (that is to become the fuel electrode layer 11b) by a printing process.

Figure 9A:
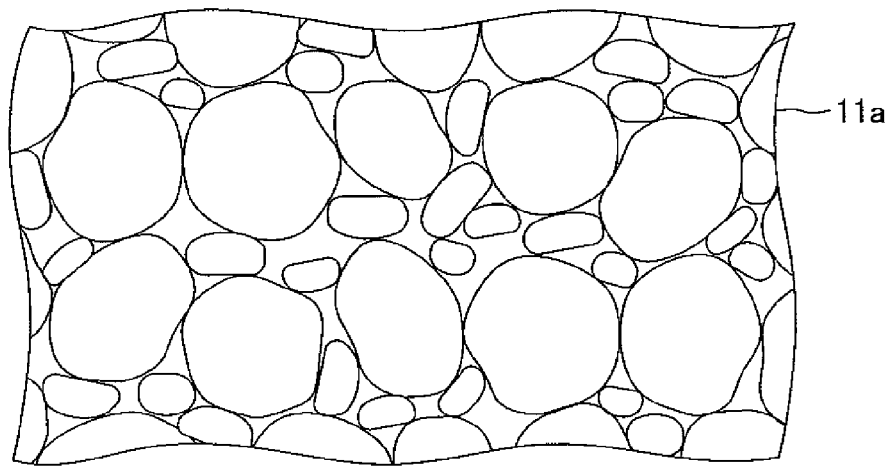
FIG. 9A is a plan view showing the state of a layer, which is being fired, during a process for manufacturing the electrolyte layer shown in FIG. 2.
Figure 9B:
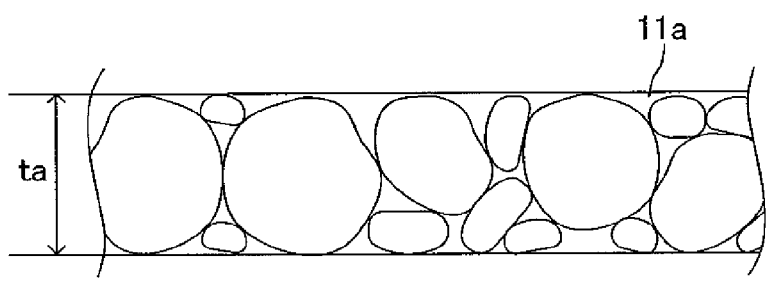
FIG. 9B is a side view showing the state of a layer, which is being fired, during a process for manufacturing the electrolyte layer shown in FIG. 2.
Figure 10A:
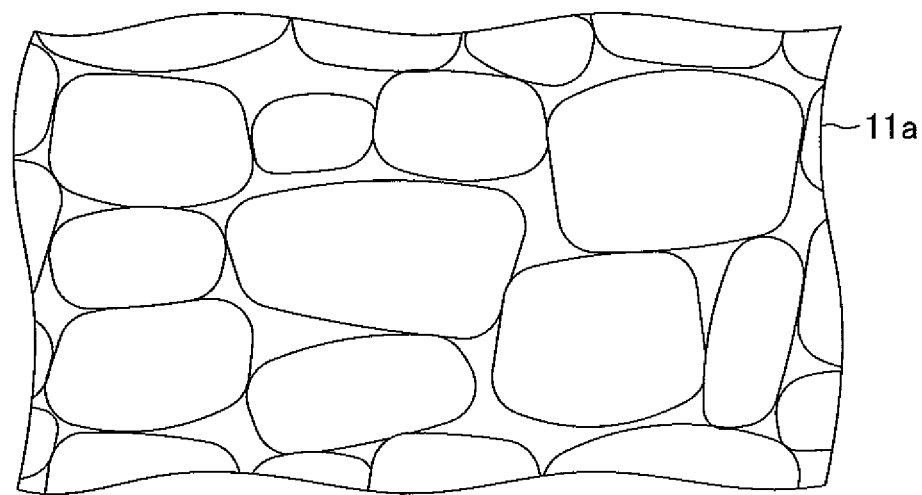
FIG. 10A is a plan view showing the state of a layer after it is fired during a process for manufacturing the electrolyte layer shown in FIG. 2.
Figure 10B:
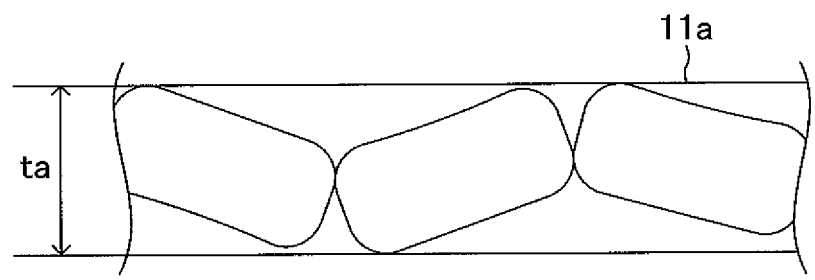
FIG. 10B is a side view showing the state of a layer after it is fired during a process for manufacturing the electrolyte layer shown in FIG. 2.

The resultant laminate (the laminate of the layer that is to become the electrolyte layer 11a and the layer that is to become the fuel electrode layer 11b) is fired under a predetermined condition. During the firing process, each YSZ particle in the sheet (that is to become the electrolyte layer 11a) gradually grows to become large, and further, the number of the particles in the thickness direction of the sheet is decreased as shown in FIGS. 9A and 9B. Finally, each particle further grows to form a flattened shape, and the layer is constituted by a single YSZ particle in the thickness direction as shown in FIGS. 10A and 10B, like the above-mentioned FIGS. 6 and 7. Thus, the electrolyte layer 11a and the fuel electrode layer 11b are formed. When a stabilizer such as yttria ($Y_2O_3$), scandium ($Sc_2O_3$), etc. is added to the powders constituting the sheet (that is to become the electrolyte layer 11a) as an additive, the growth of the particles can be promoted.

The sheet (that is to become the air electrode layer 11c) is formed on the lower surface of the fired body (specifically, the electrolyte layer 11a) by a printing process, and then, the sheet is fired at 800 to 1100° C. for one hour so as to form the air electrode layer 11c. Thus, the sheet body 11 including three layers is completed.

The separator 12 can be formed by etching or cutting.

Next, the glass material (borosilicate glass) constituting the first seal portion 13a is applied by a printing process to the portions (i.e., the lower surface of the lower frame member 12c, and the upper surface of the upper frame portion 12b) that hold the sheet body 11 at the perimetric portion of each separator 12. Then, the separators 12 and the sheet bodies 11 are stacked in alternating layers, followed by heat treatment (830° C. for one hour) for integration of the layers into a stack structure. Subsequently, a material (borosilicate-base crystallized glass or the like) constituting the second seal portion 13b is applied to the perimetric portion of the stack structure, followed by heat treatment (e.g., 850° C. for one hour) for reinforcement. The fuel cell 10 is thus completed.

Operation and Effect:

The operation and effect obtained by the structure in which the electrolyte layer 11a of the sheet body 11 has the thickness of 0.3 μm or more and 5 μm or less and the electrolyte layer 11a is made of a single particle in the thickness direction will be described below.

The IR loss (electric resistance) of the sheet body 11 is composed of the IR loss of the electrolyte layer 11a caused by electric resistance generated when oxygen ions $O^{2-}$ pass through the electrolyte layer 11a in the thickness direction, the IR loss of the fuel electrode layer 11b caused by electric resistance generated when electrons $e^-$ pass through the fuel electrode layer 11b in the thickness direction, the IR loss of the air electrode layer 11c caused by electric resistance generated when electrons $e^-$ pass through the air electrode layer 11c in the thickness direction, and the IR loss at the interface portions between these layers. As the IR loss of the sheet body 11 is small, the output of the sheet body 11 (accordingly, the output of the fuel cell 10) can be increased, as described above.

Among the IR losses constituting the IR loss of the sheet body 11, the IR loss of the electrolyte layer 11a is the greatest. Therefore, if the IR loss of the electrolyte layer 11a can be decreased, the output of the sheet body 11 (accordingly, the output of the fuel cell 10) can effectively be increased.

There is a tendency that, the thinner the electrolyte layer 11a is, the smaller the IR loss of the electrolyte layer 11a becomes. Accordingly, the IR loss of the electrolyte layer 11a can be decreased only by decreasing the thickness of the electrolyte layer 11a to, for example, 0.3 μm or more and 5 μm or less. Additionally, since the electrolyte layer 11a is made of a single particle in the thickness direction, the grain boundary (boundary between particles), which is a cause for increasing the electric resistance in the thickness direction, is reduced. Therefore, the IR loss of the electrolyte layer 11a is reduced.

Specifically, when the electrolyte layer 11a is extremely thin, and the grain boundary in the thickness direction is small, the IR loss of the electrolyte layer 11a can remarkably be reduced, compared to an electrolyte layer 11a having a thickness of about 10 μm and composed of two or more particles in the thickness direction.

When the IR loss of the electrolyte layer 11a is extremely small, the oxygen ion conductivity in the electrolyte layer 11a becomes sufficiently great. Thus, the "catalyst reaction for ionizing oxygen" in the air electrode layer 11c is promoted. Accordingly, the reaction loss at the air electrode layer 11c is reduced, compared to the case in which the electrolyte layer 11a is thick. It can be considered that the output of the sheet body 11 (accordingly, the output of the fuel cell 10) can effectively be increased from this operation.

Next, an experiment for confirming the operation and effect described above will be described below. In this experiment, plural sheet bodies 11, each having an electrolyte layer 11a with a different thickness within the range of 0.2 μm to 10 μm, were prepared. These sheet bodies 11 were manufactured by forming a very thin electrolyte layer 11a on a support member of a fuel electrode layer 11b (NiO-8YSZ) having a thickness of 150 μm, and forming an air electrode layer 11c (LSCF) on the electrolyte layer 11a. The very thin electrolyte layers were manufactured and formed by utilizing a doctor blade method, reverse doctor method, reverse roll coater method, etc.

In the sheet bodies in which the thickness ta of each of the electrolyte layers was not more than 5 μm, the electrolyte layers 11a were made of single particle in the thickness direction. On the other hand, in the sheet bodies in which the thickness ta of each of the electrolyte layers was more than 5 μm, the electrolyte layers 11a were made of two or more particles in the thickness direction.

The output density of each of the sheet bodies 11 was measured with the output voltage of each of the sheet bodies 11 adjusted to a predetermined value (constant). The output density of each of the sheet bodies 11 was measured by forming a coin cell with Φ10 μm under the condition in which the output measuring temperature was 800° C. and under the condition of gas-rich in which the rate of utilization of hydrogen and air was not more than 10%. Table 1 and FIG. 11 show the result of the measurement.

TABLE 1

| | Thickness of electrolyte layer (μm) | Number of particles in thickness direction of electrolyte layer | Output density (mW/cm²) | Result of evaluation |
|---|---|---|---|---|
| No. 1 | 0.2 | One particle | — | Crack |
| No. 2 | 0.3 | One particle | 1420 | Increased output |
| No. 3 | 0.5 | One particle | 1300 | Increased output |
| No. 4 | 1.0 | One particle | 1120 | Increased output |
| No. 5 | 1.5 | One particle | 990 | Increased output |
| No. 6 | 2.0 | One particle | 850 | Increased output |
| No. 7 | 3.0 | One particle | 690 | Increased output |
| No. 8 | 5.0 | One particle | 480 | Increased output |
| No. 9 | 7.0 | Plural particles | 330 | Low output |
| No. 10 | 10.0 | Plural particles | 280 | Low output |

Figure 11:
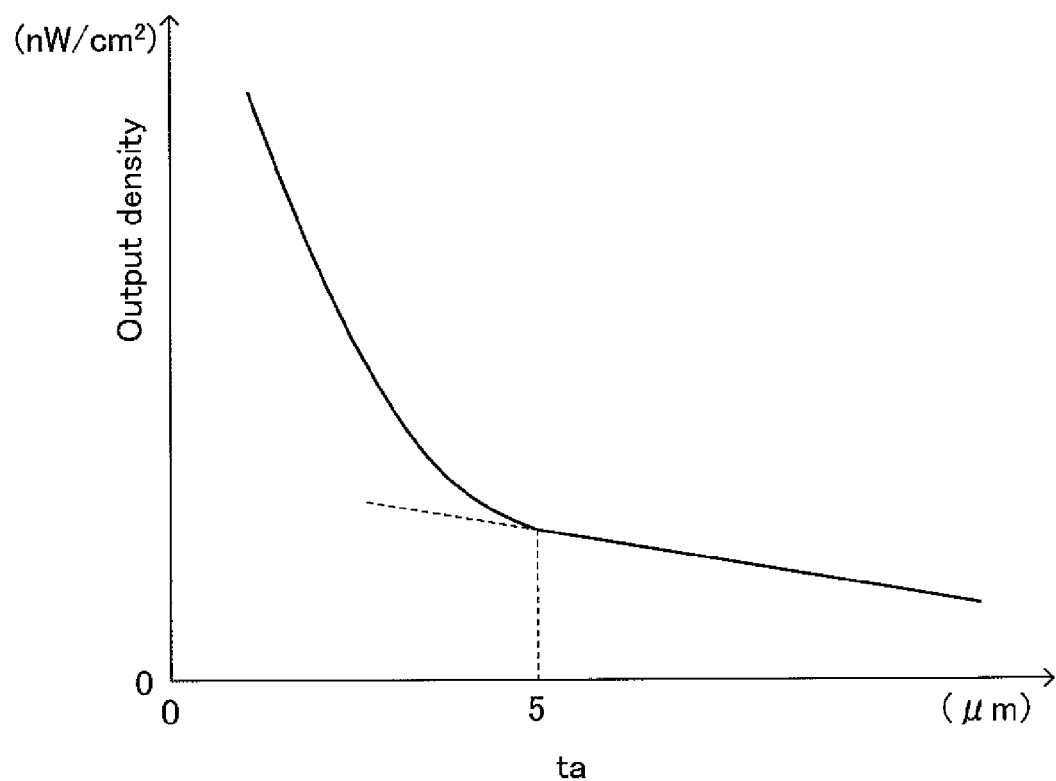
FIG. 11 is a graph showing a relationship between the thickness of the sheet body and the output density of the sheet body in a state in which the output voltage of the sheet body is adjusted to be constant.
Figure 12:
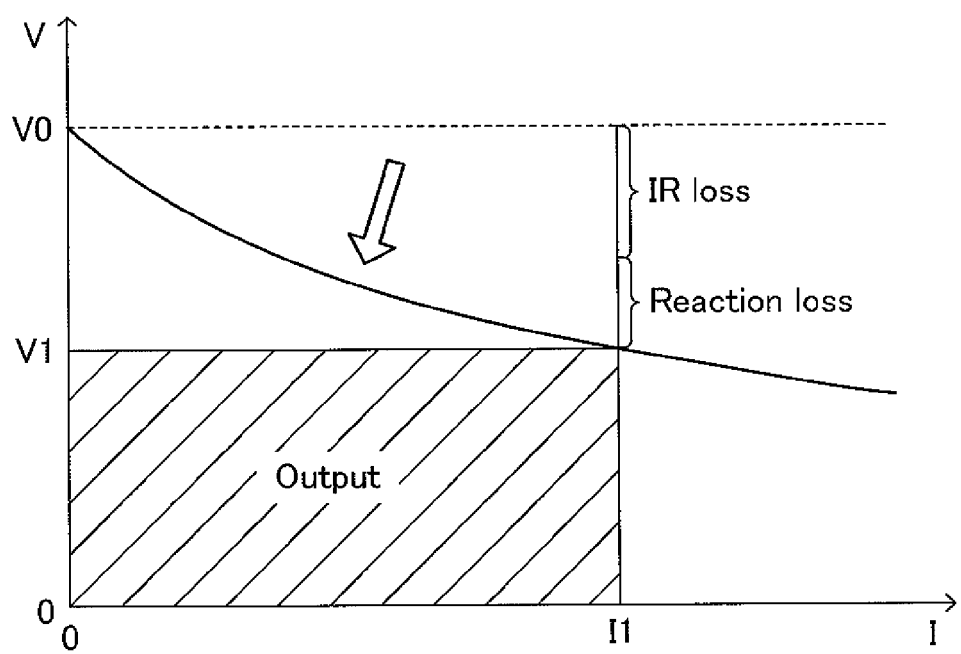
FIG. 12 is a view for explaining IR loss and reaction loss.

As shown in Table 1 and FIG. 11, as the thickness ta of the electrolyte layer 11a is smaller, the output density of the sheet body 11 is increased. This is based upon the following. Specifically, as the thickness ta of the electrolyte layer 11a is smaller, the IR loss of the electrolyte layer 11a is reduced (in addition, the reaction loss of the air electrode layer 11c is reduced), so that the current (oxygen ion $O^{2-}$) flowing through the electrolyte layer 11a increases. When the thickness ta becomes not more than 5 μm, in particular, the increasing gradient of the output density with respect to the decrease in the thickness ta is remarkably great. The reason why the increasing gradient of the output density becomes remarkably great is supposed to be caused by the synergetic effect of "the decreased IR loss of the electrolyte layer 11a" and "the decreased reaction loss of the air electrode layer 11c". When the thickness ta is 0.2 μm, crack was produced on the electrolyte layer 11a.

From the above, when the electrolyte layer 11a of the sheet body 11 is formed to have the thickness of 0.3 μm or more and 5 μm or less and to have a single particle in the thickness direction, the IR loss of the electrolyte layer 11a can remarkably be reduced. Further, it is considered that the reaction loss of the air electrode layer 11c can remarkably be reduced. As a result, the output of the fuel cell 10 can be increased.

Since the thickness of the electrolyte layer 11a having the greatest Young's modulus among the three layers constituting the sheet body 11 is extremely small, the whole sheet body 11 is likely to be deformed. Accordingly, even when the difference in the amount of expansion and contraction is locally generated in the sheet body 11 due to the temperature difference in the sheet body 11 in case where the temperature of the fuel cell 10 is rapidly raised, the sheet body 11 is easy to be deformed according to the difference in the amount of expansion and contraction. Consequently, the internal stress (thermal stress) caused by the difference in expansion and contraction can be canceled, whereby the durability of the sheet body 11 with respect to the thermal stress can be increased.

Table 2 shows the result of the experiment that was carried out for confirming the above-mentioned operation. In this experiment, plural sheet bodies 11, same as those prepared in the above-mentioned experiment, and each having the electrolyte layer with a different thickness, were prepared. For every sheet bodies 11, three sheet bodies 11 and separators 12 were stacked in alternating layers so as to form three-layered stack structures.

The temperature of each of the stack structures was raised up to 800° C. for two hours so as to make a reduction of the fuel electrode layer 11b, and then, a rapid-temperature-change-test was executed. In the rapid-temperature-change-test, the temperature of the stack structure was raised up to 800° C. for 5 minutes, while flowing hydrogen at the fuel electrode layer and flowing air at the air electrode layer at 100 cc/min respectively, and then, the temperature was lowered from 800° C. to room temperature during 30 minutes. This pattern was repeated ten times. Thereafter, it was evaluated whether or not the sheet body 11 constituting the stack structure was broken or not. Gas was flown into the stack and a leak test for the inside of the stack was carried out so as to confirm whether the sheet body 11 was broken or not.

TABLE 2

| | Thickness of electrolyte layer (μm) | Number of particles in thickness direction of electrolyte layer | Result of evaluation |
|---|---|---|---|
| No. 1 | 0.2 | One particle | Evaluation is impossible due to crack |
| No. 2 | 0.3 | One particle | Unbroken |
| No. 3 | 0.5 | One particle | Unbroken |
| No. 4 | 1.0 | One particle | Unbroken |
| No. 5 | 1.5 | One particle | Unbroken |
| No. 6 | 2.0 | One particle | Unbroken |
| No. 7 | 3.0 | One particle | Unbroken |
| No. 8 | 5.0 | One particle | Unbroken |
| No. 9 | 7.0 | Plural particles | Crack is caused when the pattern is repeated three times |
| No. 10 | 10.0 | Plural particles | Crack is caused when the pattern is repeated once |

As can be understood from Table 2, when the thickness ta was 0.3 μm or more and 5 μm or less, the sheet body 11 was not broken. Specifically, the durability of the sheet body 11 to the thermal stress is increased. Table 2 shows the result of the evaluation when the temperature was raised from room temperature to 800° C. for 5 minutes as described above. It can be confirmed that the same result of evaluation (the sheet body 11 is not broken when the thickness ta is 0.3 μm or more and 5 μm or less) can be obtained in case where the temperature is raised from room temperature to 800° C. for 1 minute by means of an infrared lamp furnace (the other conditions are the same).

As explained above, in the solid oxide fuel cell having a flat-plate stack structure according to the embodiment of the present invention, the electrolyte layer 11a of the sheet body 11 is extremely thin having a thickness of 0.3 μm or more and 5 μm or less and is composed of a single particle in the thickness direction. By virtue of this structure, the IR loss of the electrolyte layer 11a can remarkably be reduced. As a result, the output of the fuel cell 10 can be increased. In addition, since the thickness ta of the electrolyte layer 11a having high Young's modulus is extremely small, the whole sheet body 11 is easy to be deformed. Consequently, the durability of the sheet body 11 to the thermal stress is enhanced.

The present invention is not limited to the above-described embodiment, but can be modified in various other forms without departing from the scope of the present invention. In the above-described embodiment, the fuel electrode layer 11b can be formed from, for example, platinum, platinum-zirconia cermet, platinum-cerium-oxide cermet, ruthenium, or ruthenium-zirconia cermet.

Also, the air electrode layer 11c can be formed from, for example, lanthanum-containing perovskite-type complex oxide (e.g., lanthanum manganite, lanthanum cobaltite, or lanthanum ferrite, in addition to the above-mentioned lanthanum strontium cobalt ferrite). Lanthanum cobaltite, lanthanum manganite and lanthanum ferrite may be doped with strontium, calcium, chromium, cobalt, iron, nickel, aluminum, or the like. Also, the air electrode layer 11c may be formed from palladium, platinum, ruthenium, platinum-zirconia cermet, palladium-zirconia cermet, ruthenium-zirconia cermet, platinum-cerium-oxide cermet, palladium-cerium-oxide cermet, or ruthenium-cerium-oxide cermet.

In the above-mentioned embodiment, the sheet body 11 and the separator 12 have a planar shape of square. However, the sheet body 11 and the separator 12 may have a planar shape of rectangle, circle, ellipse, etc.

What is claimed is:

1. A solid oxide fuel cell comprising:
   one or more sheet bodies, each sheet body being defined by a fired stack of layers comprising a polycrystalline solid electrolyte layer, a fuel electrode layer on an upper surface of the polycrystalline solid electrolyte layer, and an air electrode layer on a lower surface of the polycrystalline solid electrolyte layer; and
   a plurality of support members supporting the one or more sheet bodies;
   wherein the sheet bodies and the support members define alternating stacked layers;
   wherein a fuel gas channel is defined adjacent to each sheet body and between each sheet body and a respective one of the support members formed above the respective sheet bodies, and an oxygen-containing air channel is defined adjacent to each sheet body and between each sheet body and a respective one of the support members formed below the respective sheet bodies; and
   wherein each particle that constitutes the polycrystalline solid electrolyte layer is formed in a flattened shape extending in a plane direction of the polycrystalline solid electrolyte layer having a thickness of the polycrystalline solid electrolyte layer that is the same as that of a single particle in a thickness direction of the polycrystalline solid electrolyte layer, and the thickness of the polycrystalline solid electrolyte layer is 0.3 μm or more to 5 μm or less.

2. A solid oxide fuel cell according to claim 1, wherein in a field of view including particles which form the polycrystalline solid electrolyte layer, of a predetermined number of two or more as viewed from a side, an average value of ratios of the height of the particles in the thickness direction of the polycrystalline solid electrolyte layer to widths of the particles in the plane direction of the polycrystalline solid electrolyte layer with respect to the predetermined number of particles is not more than 3.

3. The solid oxide fuel cell according to claim 1, wherein a thickness of the one or more sheet bodies is 20 μm or more and 200 μm or less.

4. The solid oxide fuel cell according to claim 1, wherein the thickness of the polycrystalline solid electrolyte layer is 0.3 μm or more to 4 μm or less.

5. The solid oxide fuel cell according to claim 1, wherein the thickness of the polycrystalline solid electrolyte layer is 0.3 μm or more to 2 μm or less.

6. A solid oxide fuel cell comprising:
   a polycrystalline solid electrolyte layer;
   a fuel electrode layer on an upper surface of the solid electrolyte layer; and
   an air electrode layer on a lower surface of the solid electrolyte layer;
   wherein the solid electrolyte layer, the fuel electrode layer, and the air electrode layer define fired stacked layers; and
   wherein each particle that constitutes the polycrystalline solid electrolyte layer is formed in a flattened shape extending in a plane direction of the polycrystalline solid electrolyte layer having a thickness of the polycrystalline solid electrolyte layer, which is the same as that of a single particle in a thickness direction of the polycrystalline solid electrolyte layer, is 0.3 μm or more to 5 μm or less.

7. The solid oxide fuel cell according to claim 5, wherein the thickness of the polycrystalline solid electrolyte layer is 0.3 μm or more to less than 4 μm.

8. The solid oxide fuel cell according to claim 6, wherein the thickness of the polycrystalline solid electrolyte layer is 0.3 μm or more to 2 μm or less.

* * * * *